(12) United States Patent
Queiroz

(10) Patent No.: US 6,608,928 B1
(45) Date of Patent: Aug. 19, 2003

(54) GENERIC PRE-PROCESSING OF MIXED RASTER CONTENT PLANES

(75) Inventor: Ricardo de Queiroz, Pittsford, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/432,600

(22) Filed: Nov. 3, 1999

(51) Int. Cl.$^7$ ................................................ G06K 9/34
(52) U.S. Cl. ........................ 382/173; 382/166; 382/232
(58) Field of Search ........................ 382/173, 282–284, 382/176, 257, 166, 232; 375/240.1

(56) References Cited

U.S. PATENT DOCUMENTS 5,778,092 A * 7/1998 MacLeod et al. ............ 382/176
6,437,881 B1 * 8/2002 Baba et al. .................. 382/176

* cited by examiner

*Primary Examiner*—Amelia M. Au
*Assistant Examiner*—Colin LaRose
(74) *Attorney, Agent, or Firm*—Oliff & Berridge, PLC

(57) ABSTRACT

A mixed raster content system and method improves the performance of the compression process by reducing the amount of data. The system and method uses a selector plane as a reference to aid in reducing the amount of data necessary to encode each of associated planes. A smoothing technique is used to pre-process the associated planes using the information contained in the selector plane, thereby reducing the amount of data that will be subjected to further processing. The system and method determines the useless data, smooths the boundary of the useless data, and replaces the useless data by values that improve compression.

33 Claims, 9 Drawing Sheets

GENERIC PRE-PROCESSING OF MIXED RASTER CONTENT PLANES

BACKGROUND OF THE INVENTION

1. Field of Invention

This invention generally relates to processing compressed digital images.

2. Description of Related Art

Data compression is required in data handling processes, where too much data is present for practical applications using the data. Commonly, compression is used in communication links to reduce the transmission time or required bandwidth. Similarly, compression is preferred in image storage systems, including digital printers and copiers, where "pages" of a document to be printed are stored temporarily in precollation memory. The amount of media space on which the image data is stored can be substantially reduced with compression. Generally speaking, scanned images, i.e., electronic representations of hard copy documents, are often large, and thus make desirable candidates for compression.

During compression, a scanned image may take a form of a pixel map, where the mapped image is created by digitizing light reflected off of physical media using the scanner. A pixel map is one in which each pixel represents some "value" which indicates the color of the image, or, in the case of gray scale document, how light or dark the image is, at a particular point. Pixel maps may have values that are taken from a set of discrete, non-negative integers. The term bitmap is used to mean a binary pixel map in which pixels can take one of two values, 1 or 0.

SUMMARY OF THE INVENTION

This invention is directed to compressing images from documents which contain different types of data. Mixed Raster Content (MRC) is one approach to satisfying the compression needs of differing types of data. MRC involves separating a composite image into a plurality of planes, and separately applying an appropriate compression technique to each image plane. The document is represented by a pixel map which is decomposed into a three-plane representation of a upper plane, a lower plane, and a binary selector plane that is used to select between the upper and lower planes, for example.

While the MRC technique has shown to be successful at separately processing planes, the segmentation process leaves data in the associated planes in areas that will not be chosen by the selector plane. Thus, the associated planes often will have pixels that are not used to reconstruct the final image. This often results in an increase in the number of bits of useless data that are required to encode the entire image, thereby decreasing the compression ratio.

The systems and methods of this invention improve the performance of the compression process by reducing the amount of data. This invention provides systems and methods that use the selector plane as a reference to aid in reducing the amount of data necessary to encode each of the associated planes.

The systems and methods of this invention provide a smoothing technique used to pre-process the upper and lower planes using the information contained in the selector plane, thereby reducing the amount of data that will be subjected to further processing.

The systems and methods of this invention provide techniques that determine useless data and then smooth the boundary between the actual image data and the useless data. In the systems and methods of this invention, the determined useless data is replaced by values that improve compression.

In various exemplary embodiments of the systems and methods of this invention, useless data in non-image areas of a plane is replaced by a constant value and the boundary regions are smoothed by filtering using a segmented-computing filter structure. In various exemplary embodiments of the systems and methods of this invention, the boundary regions are smoothed independently of the compression techniques to be used. Thus the boundary regions reduce the distortion and increase the compression rate achieved by compressing the planes using generic compressors.

It should be appreciated that the compression systems and methods of this invention can be applied to any set of compression techniques for separately processing the various types of data contained in a composite image. Accordingly, the compression/decompression methods and systems of this invention can be applied to any number of systems, including digital printers and copiers, that need to provide compressed or decompressed images. Systems implementing this invention can include data or image processing systems capable of compressing or decompressing images. The systems and methods described herein are efficient and result in smoother boundaries between regions of different image data types.

These and other features and advantages of this invention are described in or are apparent from the following detailed description of various exemplary embodiments.

BRIEF DESCRIPTION OF THE DRAWINGS

Various exemplary embodiments of this invention will be described in detail, with reference to the following figures, wherein.

DETAILED DESCRIPTION OF PREFERRED EMBODIMENTS

Figure 1:
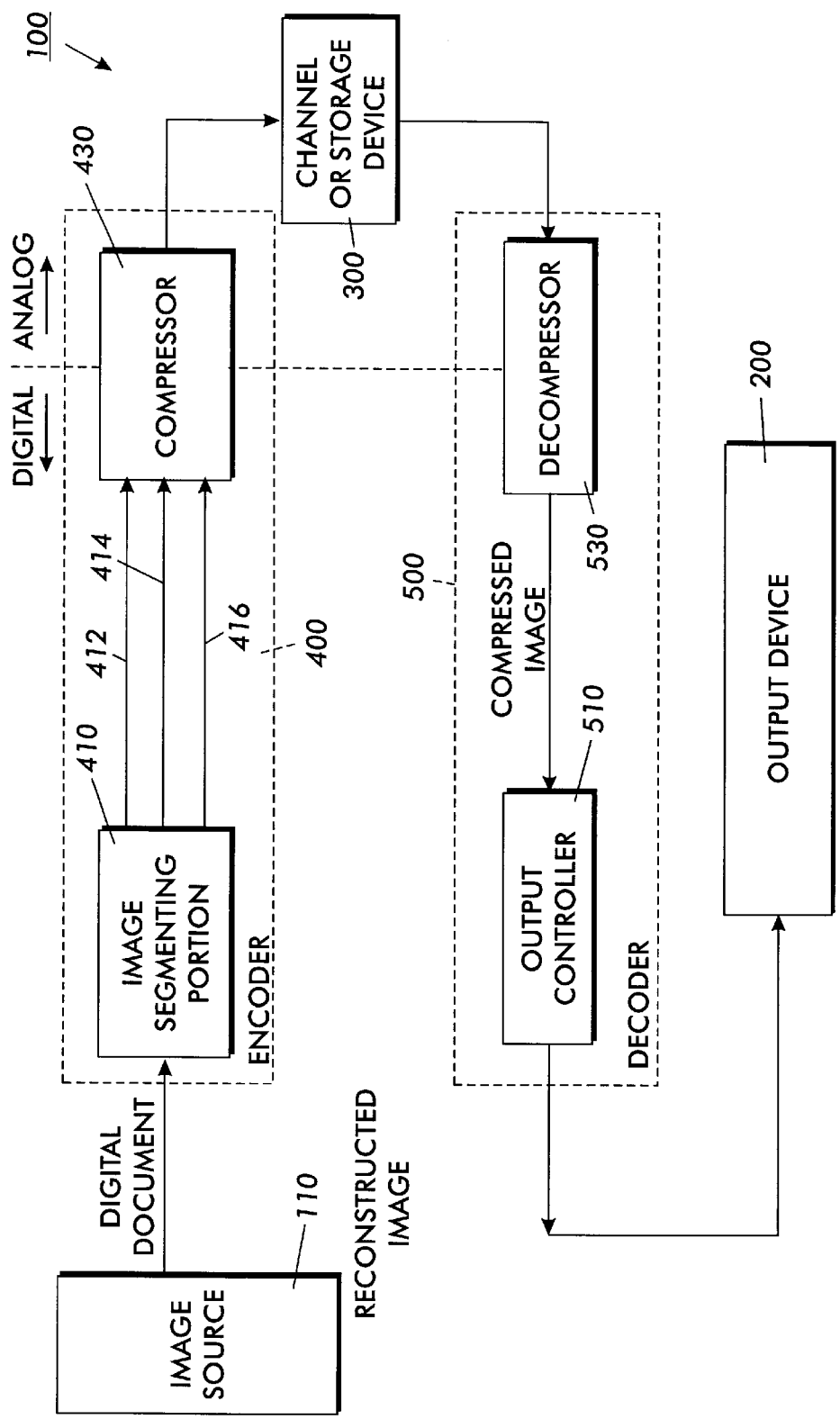
FIG. 1 is a generalized block diagram of one embodiment of a compression and decompression system according to this invention.

FIG. 1 shows one exemplary embodiment of a generalized functional block diagram of a compression and decompression system 100 according to this invention. The compression and decompression system 100 includes an image source 110 that may be any one of a number of different sources, such as a scanner, a digital copier, a facsimile device suitable for generating electronic image data, or a device suitable for storing and/or transmitting the electronic image data, such as a client or server of a network. The electronic image data from the image source 110 is provided to an encoder 400 of the compression and decompression system 100.

In particular, the encoder 400 includes an image segmenting portion 410 that divides the electronic image data into a plurality of planes. The image is segmented into at least two different types of image planes and at least one selector plane. In one exemplary embodiment, the segmenting operation may be accomplished by windowing or cropping that enables identifying and copying data associated with each of the image planes from the input document to a memory of the encoder 400.

Once stored, the planes of data are output by the image segmenting portion 410 over at least the signal lines 412, 414 and 416 to a compressor 430. In the compressor 430, each plane of the image data may be operated on separately using one of a variety of compression operations associated with the particular compression technique to compress the image data within that plane.

Once compressed, each plane of the image data then is preferably transferred to the channel or storage device 300. The channel or storage device 300 can be either or both of a channel device for transmitting the compressed image data to the decoder 500 or a storage device for indefinitely storing the compressed image data until there arises a need to decompress the compressed image data. The channel device can be any known structure or apparatus for transmitting the compressed image data from a first apparatus implementing the encoder 400 according to this invention to a physically remote decoder 500 according to this invention. Thus, the channel device can be a public switched telephone network, a local or wide area network, an intranet, the Internet, a wireless transmission channel, any other distributed network, or the like.

Similarly, the storage device can be any known structure or apparatus for indefinitely storing compressed image data, such as a RAM, a hard drive and disk, a floppy drive and disk, an optical drive and disk, flash memory or the like. Moreover, the storage device can be physically remote from the encoder 400 and/or the decoder 500, and reachable over the channel device described above.

When the image is to be decompressed, in one exemplary embodiment, the planes of data are then provided to and processed by the decoder 500. In particular, the decoder 500 includes a decompressor 530 that receives the planes of data from the channel or storage device 300 and an output controller 510 that combines the decompressed planes from the decompressor 530 to form the decompressed image. Though the decoder 500 is shown in FIG. 1 as physically separate from the encoder 400, it should be understood that the decoder 500 and the encoder 400 may be different functional and/or structural aspects of a single physical device.

The output controller 510 sends the reconstructed image to the output device 200. It should be understood that the output device 200 can be any device that is capable of outputting or storing the decompressed image data generated according to the invention such as a printer, facsimile device, a display device, a memory, or the like.

Figure 2:
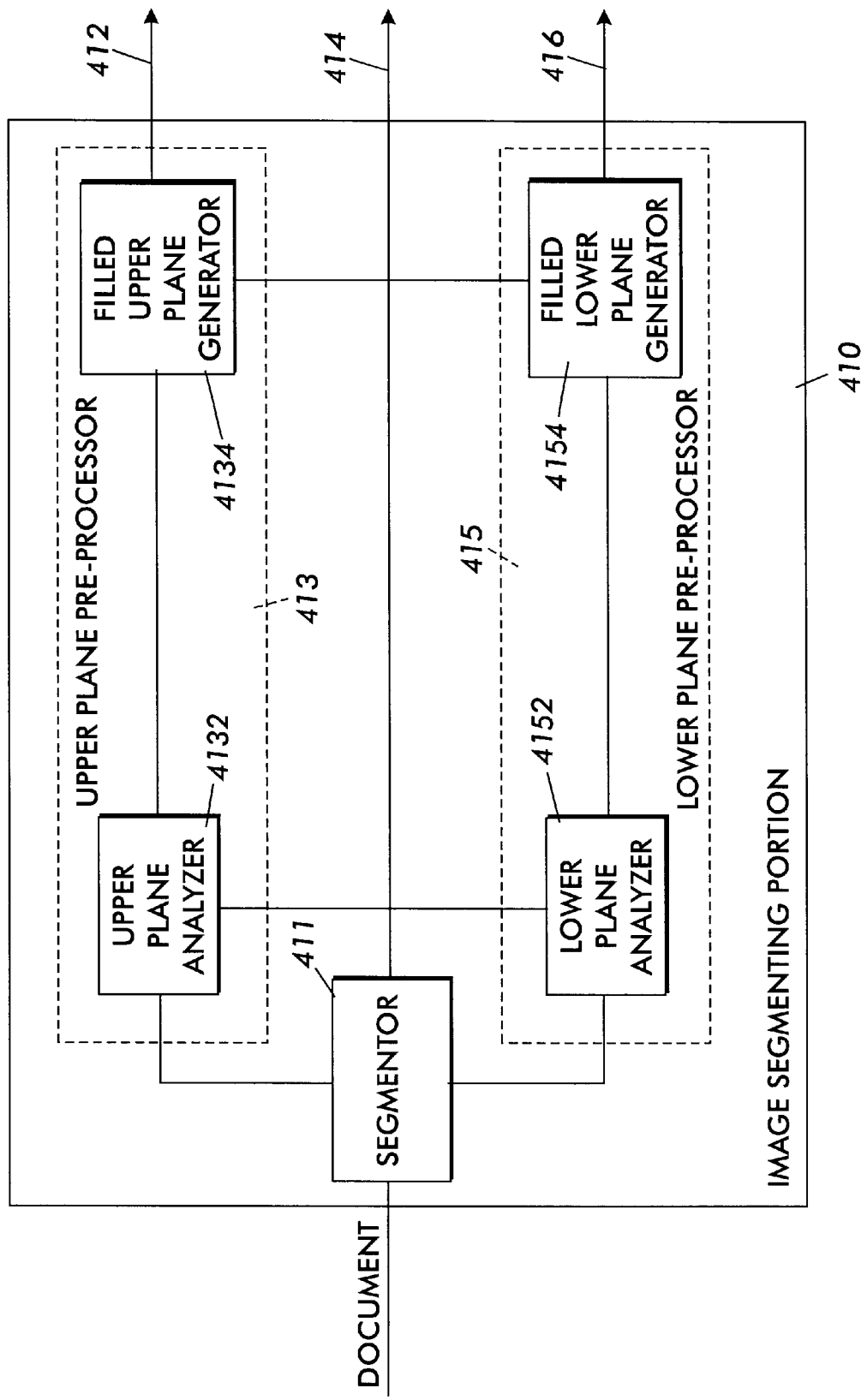
FIG. 2 shows one embodiment of a preferred image segmenting portion according to this invention.

FIG. 2 shows one exemplary embodiment of the image segmenting portion 410 of the encoder 400 according to this invention. The image segmenting portion 410 includes a segmentor 411. The image segmenting portion 410 also includes an upper plane pre-processor 413 and a lower plane pre-processor 415, each connected to the segmentor 411. The upper plane pre-processor 413 includes an upper plane analyzer 4132 and a filled upper plane generator 4134 connected to the upper plane analyzer 4132. The lower plane pre-processor 415 includes a lower plane analyzer 4152 and a filled lower plane generator 4154 connected to the lower plane analyzer 4152.

In practice, the segmentor 411 decides which pixels of the image data are to be stored into the upper plane or the lower plane and generates a selector plane that indicates, for each pixel, whether that pixel is to be stored in the upper or lower plane. The upper plane analyzer 4132 analyzes the selector plane to determine the non-image areas, i.e., those areas containing useless data, in the upper plane. Similarly, the lower plane analyzer 4152 analyzes the selector plane to determine the non-image areas, i.e., those areas containing useless data, in the lower plane. The filled upper plane generator 4134 receives the output from the upper plane analyzer 4132 and generates "false" image data from the actual image data so that the useless data in the non-image areas will be completely replaced with false image data. The filled lower plane generator 4154 receives the output from the lower plane analyzer 4152 and generates "false" image data from the actual image data so that the useless data in the non-image areas will be completely replaced with false image data.

The upper plane pre-processor 413 outputs the filled upper plane on a signal line 412 to the compressor 430. The segmentor 411 outputs the selector plane on a signal line 414 to the compressor 430. The lower plane pre-processor 415 outputs the filled lower plane on a signal line 416 to the compressor 430.

It should be appreciated that, depending on the image to be compressed, any known or later developed data types may be pre-processed by the upper plane pre-processor 413 and the lower plane pre-processor 415, such as continuous tone or picture data, halftone data, line art or graphics data, text data or the like. Thus, any set of compression techniques for these various data types can be used, and the system and method of this invention can be used with any such set of compression techniques.

It should be appreciated that one of ordinary skill in the art can easily modify the structure shown in FIG. 2 using any complementary known or later-developed image type and/or any known or later developed image segmentation technique without any undue experimentation or any unpredictability in the results of such modifications. Thus, while the scope of this disclosure is specifically intended to encompass all such combinations or sets of data types and/or image segmentation techniques, currently known or later developed, it is not necessary to describe to one of ordinary skill in the art each such combination and the resulting modifications to the structure shown in FIG. 2.

It should be further appreciated that the systems and methods of this invention are not limited to one upper plane and one lower plane, and that any number of upper-lower pairs of planes may be segmented. In particular, as discussed above, the segmentor 411 may decompose the image into an upper plane, a lower plane and a selector plane. Then, the filled upper plane from the filled upper plane generator 4134 can be output to a second image segmenting portion, where the upper plane is further decomposed into a lower sub-upper plane, an upper sub-upper plane, and a second selector plane. In this case, the filled upper plane data output on line 412 is input to an additional segmentor in the second image segmenting portion. Furthermore, the filled upper sub-upper plane can further be decomposed into separate planes, and any number of upper planes may be segmented as appropriate. Thus, any number of additional image segmenting portions may be cascaded together.

Figure 3:
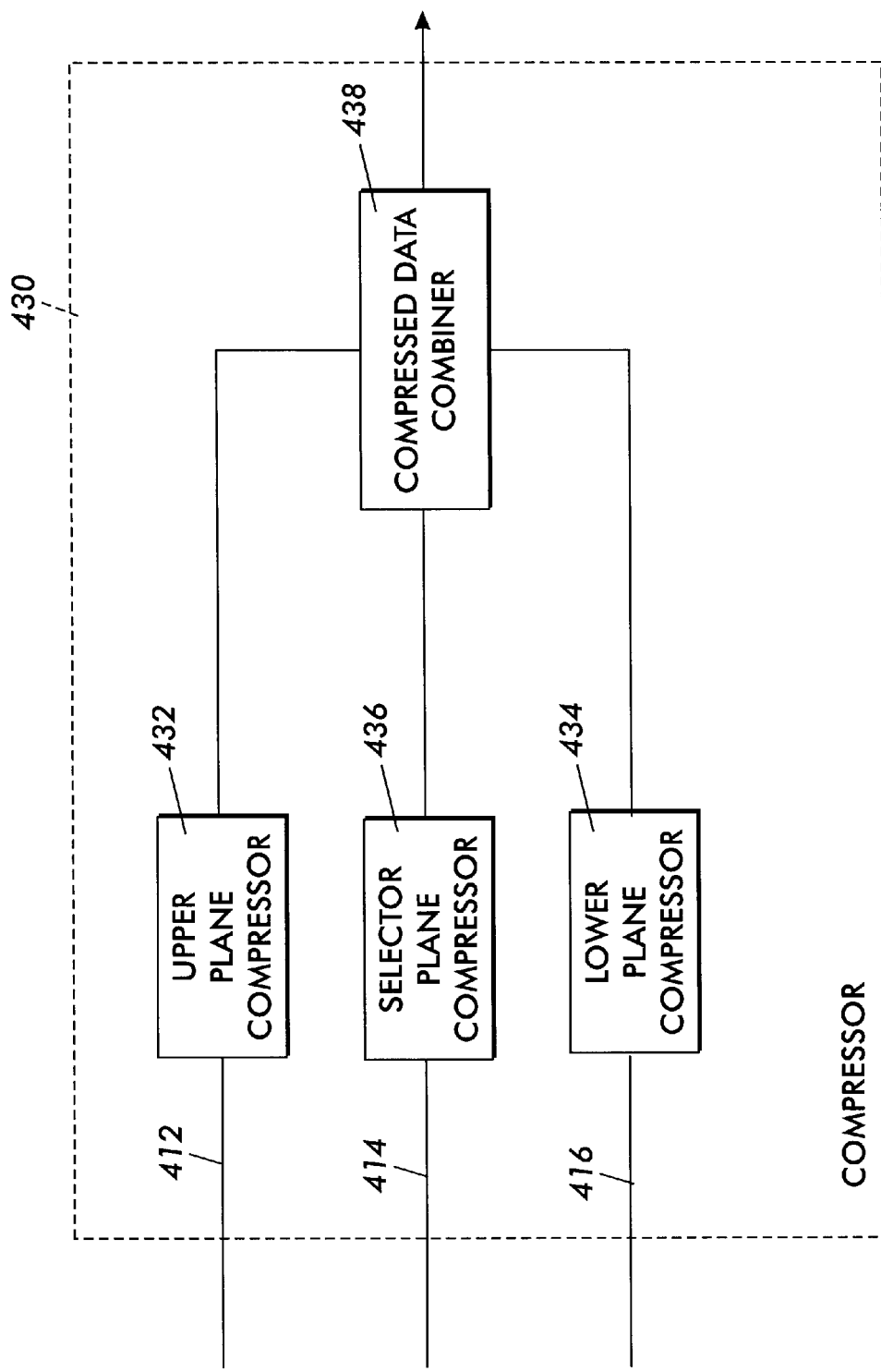
FIG. 3 shows one embodiment of a preferred compressor according to this invention.

FIG. 3 shows one exemplary embodiment of the compressor 430 of the encoder 400 according to this invention. The compressor 430 includes an upper plane compressor 432, a lower plane compressor 434 and a selector plane compressor 436. The compressor 430 further includes a compressed data combiner 438 connected to the upper plane compressor 432, the lower plane compressor 434, and the selector plane compressor 436. It should be appreciated that, depending on the image to be compressed, the upper and lower planes may include any known or later developed data type, such as continuous tone or picture data, halftone data, line art or graphics data, text data or the like. Thus, any set of compression techniques for these various data types can be used, and the system and method of this invention can be used with any such set of compression techniques.

It should further be appreciated that one of ordinary skill in the art can easily modify the structure shown in FIG. 3 using any complementary known or later-developed image type and/or only known or later developed compression technique without any undue experimentation or any unpredictability in the results of such modifications. Thus, while the scope of this disclosure is specifically intended to encompass all such combinations or sets of data types and/or compression techniques, currently known or later developed, that include one or more segment compression techniques, it is not necessary to describe to one of ordinary skill in the art each such combination and the resulting modifications to the structure shown in FIG. 3.

In operation, the "filled" upper plane is input from the image segmenting portion 410 to the upper plane compressor 432, while the "filled" lower plane is input to the lower plane compressor 434 and the selector plane is input to the selector plane compressor 436. The upper and lower planes are each compressed by the upper and lower plane compressors 432 and 434 using an appropriate compression technique for the type of image data stored in the upper and lower planes, respectively. The compressed upper and lower planes are then output to the compressed data combiner 438. Similarly, the selector plane is compressed by an appropriate compression technique by the selector phase compressor 436. The compressed selector plane is also output to the compressed data compressor 438.

The compressed data combiner 438 combines the compressed data in the upper and lower planes, along with the compressed selector plane, into a single data structure, such as a file. The compressed data combiner 438 can also optionally apply a further level of compression, such as Huffman encoding, to the single data structure. The compressed data combiner 438 then outputs the single data file, whether further compressed or not, to the channel or storage device 300.

Figure 4:
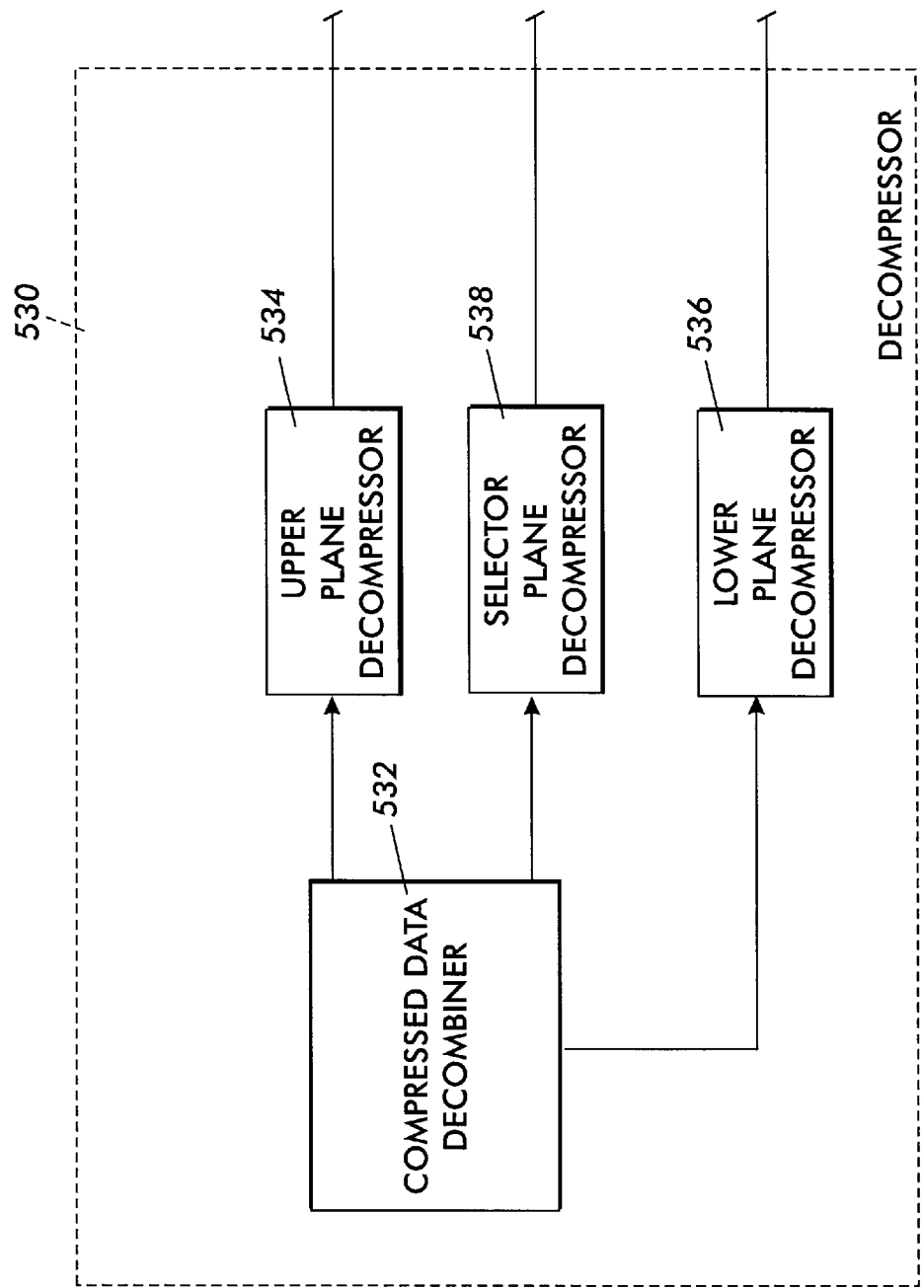
FIG. 4 shows one embodiment of a decompressor according to this invention.

FIG. 4 shows one embodiment of a decompressor according to this invention. In particular, the compressed image data is input into the decompressor 530. The decompressor 530 includes a compressed data decombiner 532, and an upper plane decompressor 534, a lower plane decompressor 536 and a selector plane decompressor 538, each connected to the compressed data decombiner 532. The compressed data decombiner 532 inputs the single data structure from the channel or storage device 300. If the single data structure has been further compressed, the compressed data decombiner 532 will first decompress it. The compressed data decombiner 532 then splits the single data structure into the compressed upper plane data, the compressed lower plane data, and the compressed selector plane data. The compressed upper plane data is output to the upper plane decompressor 534. The compressed lower plane data is output to the lower plane decompressor 536. Similarly, the compressed selector plane data is output to the selector plane decompressor 538.

The upper plane decompressor 534 decompresses the compressed upper plane data using the complimentary decompression technique to the appropriate compression technique used to compress the upper plane. The upper plane decompressor 534 then outputs the decompressed upper plane data to the output controller 510. Similarly, the lower plane decompressor 536 decompresses the compressed lower plane data using the complimentary decompression technique to the appropriate compression technique used to compress the lower plane. The lower plane decompressor 536 then outputs the decompressed lower plane data to the output controller 510.

Likewise, the selector plane decompressor 538 decompresses the compressed selector plane data using the complimentary decompression technique to the appropriate compression technique used to compress the selector plane. The selector plane decompressor 538 then outputs the decompressed selector plane to the output controller 510.

The output controller 510 recombines the decompressed upper and lower planes into a single output image based on the decompressed selector plane output from the selector plane decompressor 538. In particular, in one exemplary embodiment, the output controller 510 first pastes one of the lower plane or the upper plane, including the filled data, into its appropriate location in the decompressed image buffer. The output controller 510 then pastes the image areas of the other of the lower plane or the upper plane into each area's appropriate location in the decompressed image buffer, based on the selector plane. Thus, each image portion of the other of the lower plane or the upper plane is pasted over the corresponding unused portion of the one of the lower or upper plane. The planes are pasted in this manner because the filled useless data in the one of the lower or upper plane is replaced with image data of the other of the lower or upper plane. This filled useless data is false, and is removed by pasting the data of the image areas of the other of the lower or upper plane over the non-image areas of the one of the lower or upper plane.

In another exemplary embodiment, the output controller 510, using the selector plane, pastes each image portion of the upper plane and the lower plane into its appropriate location in the decompressed image. Thus, only the image portions, without the filled useless data in the upper and lower plane, is pasted into the corresponding portion of the decompressed image. That is, the false image data and optionally the false useless data of one of the planes is not used in the pasting process.

It should be appreciated that the image portions of the upper plane and the lower plane may be pasted into the corresponding portion in using any known or later developed methods and systems. Thus, it should be appreciated that the methods and systems of this invention are not limited to the above-described exemplary embodiments, and that any methods and systems for pasting the image areas while omitting the non-image areas may be used.

It should also be appreciated that the above-outlined structures for the image segmenting portion 410, the compressor 430 and the decompressor 530 are functional in nature. That is, FIGS. 2, 3 and 4 show the functional organization of the image segmenting portion 410, the compressor 430 and the decompressor 530, with each structure being implemented, in these various exemplary embodiments, on a general purpose computer. However, each of the image segmenting portion 410, the compressor 430, the output controller 510 and the decompressor 530 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. Furthermore, as set forth above, all of the image segmenting portion 410, the compressor 430, the output controller 510 and the decompressor 530 can be implemented on a single general purpose computer, a single special purpose computer, a single programmed microprocessor or microcontroller and peripheral integrated circuit elements, a single ASIC or other integrated circuit, a single digital signal processor, a single hardwired electronic or logic circuit such as a discrete element circuit, a single programmable logic device such as a PLD, PLA, FPGA or PAL, or the like.

Figure 5:
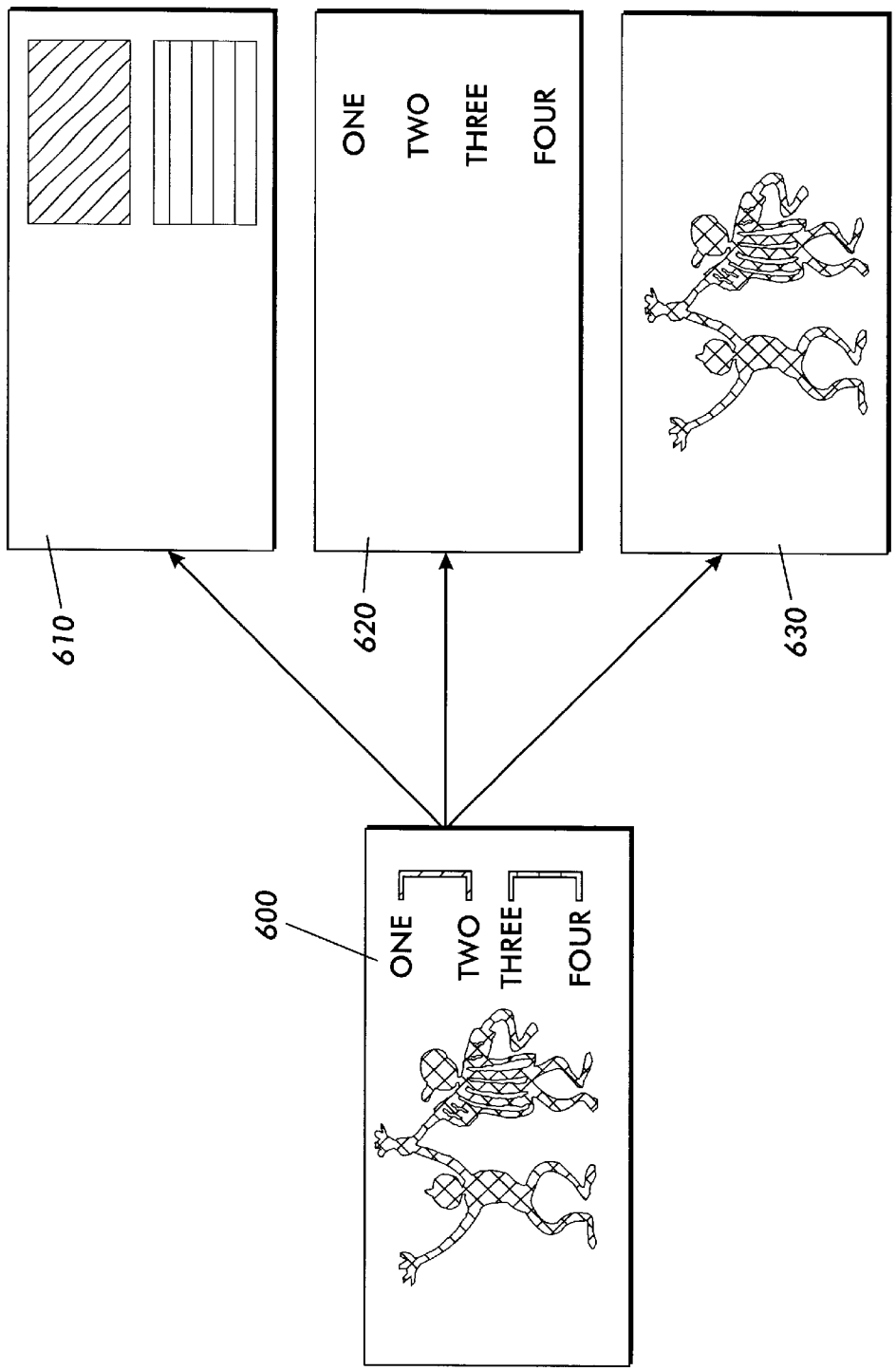
FIG. 5 shows one embodiment of a pixel map representation of a document according to this invention.

As shown in FIG. 5, a pixel map representation of a document 600 usable with various exemplary embodiments of this invention may be segmented into three separate planes using the MRC technique. An upper plane 610 contains color signals for a first subset of image data in the document. A lower plane 630 contains image signals for a second subset of image data in the document. A selector plane 620 selects between the first subset signals and the second subset signals when decompressing the compressed pixel map representation of the document and pre-processing the upper and lower image planes based upon data contained in the selector plane. The upper and lower planes may be stored at the bit depth same or at different bit depths. However, it should be appreciated that the planes can include a reduction in the bit depth. It should also be appreciated that compression of the planes may be done in any suitable format, including, but not limited to, JPEG, MMR, MR, MH, JBIG, JPEG2000, JBIG2 and the like.

It should be appreciated that although the terms "upper" and "lower" are used to describe the image planes on which data resides, it is not intended to limit this invention to any particular arrangement. Accordingly, the planes are not limited to particular data types.

In one embodiment, the upper plane 610 contains the "ink colors" of upper items such as text. The lower plane 630 contains both information that is pertinent to the background color of the page and the continuous-tone pictures that are found on the page. The selector plane 620 may be stored at higher resolution than the upper and lower planes 610 and 630. The selector plane 620 is used to identify, for each pixel in the selector plane 620, whether to use the pixel value found in the upper plane 610 or the lower plane 630 during reconstruction. In various exemplary embodiments, a "white" pixel in the selector plane 620, i.e., a logical "0" value, means the pixel value should be taken from the corresponding pixel from the lower plane 630, and a "black" pixel in the selector plane 620, i.e. a logical "1" value, means that the pixel value should be taken from the corresponding pixel from the upper plane 610.

It should also be appreciated that, although FIG. 5 shows only one upper plane and one lower plane, as discussed above, any number of upper-lower pairs of planes may be used. In particular, the planes may be decomposed into upper plane, lower plane and a selector plane. Then, the upper plane can be decomposed into a lower sub-upper plane, an upper sub-upper plane, and a second selector plane. Furthermore, it should be appreciated that the systems and methods of this invention may be used with planes that are composed of multiple superimposed separations. Accordingly, the planes are not limited to any particular combinations, or number, of image data types.

The selector plane 620 may be a bitmap determined using a technique suitable for finding text or the like on an original pixel map. In one exemplary embodiment of this invention, the bitmap forming the selector plane 620 includes pixels having a 1 value to indicate the upper, or text plane, and a 0 to indicate the lower, or everything else, plane.

The upper plane 610, which may be stored at a reduced resolution relative to the original pixel map, contains color, or gray scale, information of items such as text. The upper plane 610 is determined using the selector plane 620. The lower plane 630, which also may be stored at a reduced resolution relative to the original pixel map, is then determined. The lower plane 630 contains background color information, as well as continuous tone image information, i.e., information including tints as well as color or gray scale data, but with all small, text-like features deleted.

Figure 6:
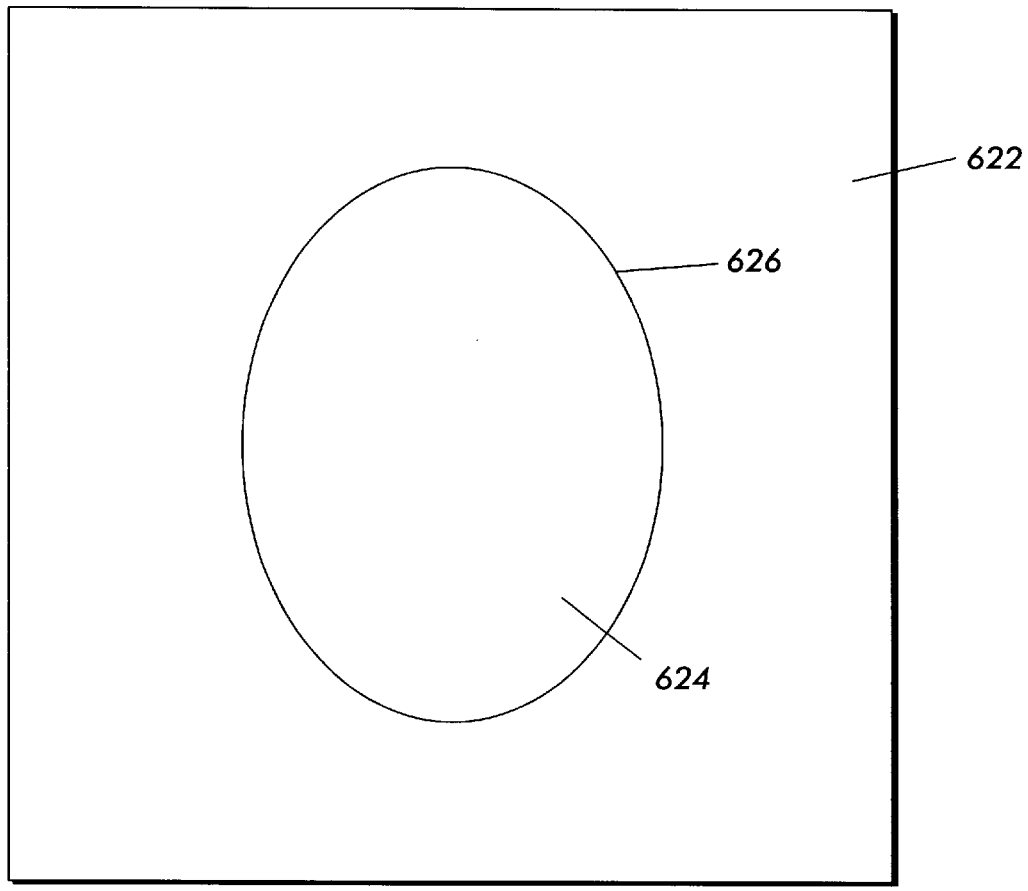
FIG. 6 illustrates one embodiment of a composite image according to this invention.

FIG. 6 shows one exemplary embodiment of a selector plane according to this invention. As shown in FIG. 6, the selector plane 620 contains a first region 622, or image area, that includes image data, a second region 624, or non-image area, that includes non-image, or useless, data, and a third region 626 of the non-image area 624 that includes pixels close to the transition region between the data types of image and non-image areas 622 and 624. During compression, the total bit-rate and distortion achieved will be given by the individual contributions of each of the first-third regions 622–626. In various exemplary embodiments of this invention, to reduce the bit-rate and the distortion, image values are created for the non-image, or useless, data region, i.e., the second and third regions 624 and 626.

Since the second region 624 contains non-image, or useless, data, the second region 624 does not contribute to the reconstructed image and its distortion is null. The image data in the first region 622 is beyond the reach of the padding procedure, being only dependent on the encoder 400 and on the input image data. Thus, in various exemplary embodiments of this invention, to reduce the bit-rate and distortion, the bit-rate in the second region 624 is reduced, while the distortion in the third region 626 is reduced. Accordingly, in these various exemplary embodiments, in order to reduce the bit-rate, all pixels are set in the second region 624 to a single constant pixel value. To reduce distortion in the third, transition, or boundary, region 626, the boundary region 626 is smoothed to avoid discontinuities. This is done, for example, to reduce possible ringing artifacts. As smooth regions tend to be well encoded without spending too many bits, the bit-rate for the third region 626 is assumed to be insignificant.

In one exemplary embodiment of this invention, the constant value to be used for the pixels in the second region 624 is a predefined image value for all pixels in the second region 624, such as 128, which is the middle of the pixel range. The value of 255, i.e., white, can also be used to emulate background paper. In other exemplary embodiments, the constant value is determined by identifying the second region 624 as a single connected region. In this case, for example, the average of the border pixels is used as the constant value. It should be appreciated that, depending on the region to be smoothed, the pixel value to be used may be any constant value. Thus the smoothing operation of the system and method of this invention can be done with any such values.

Figure 7:
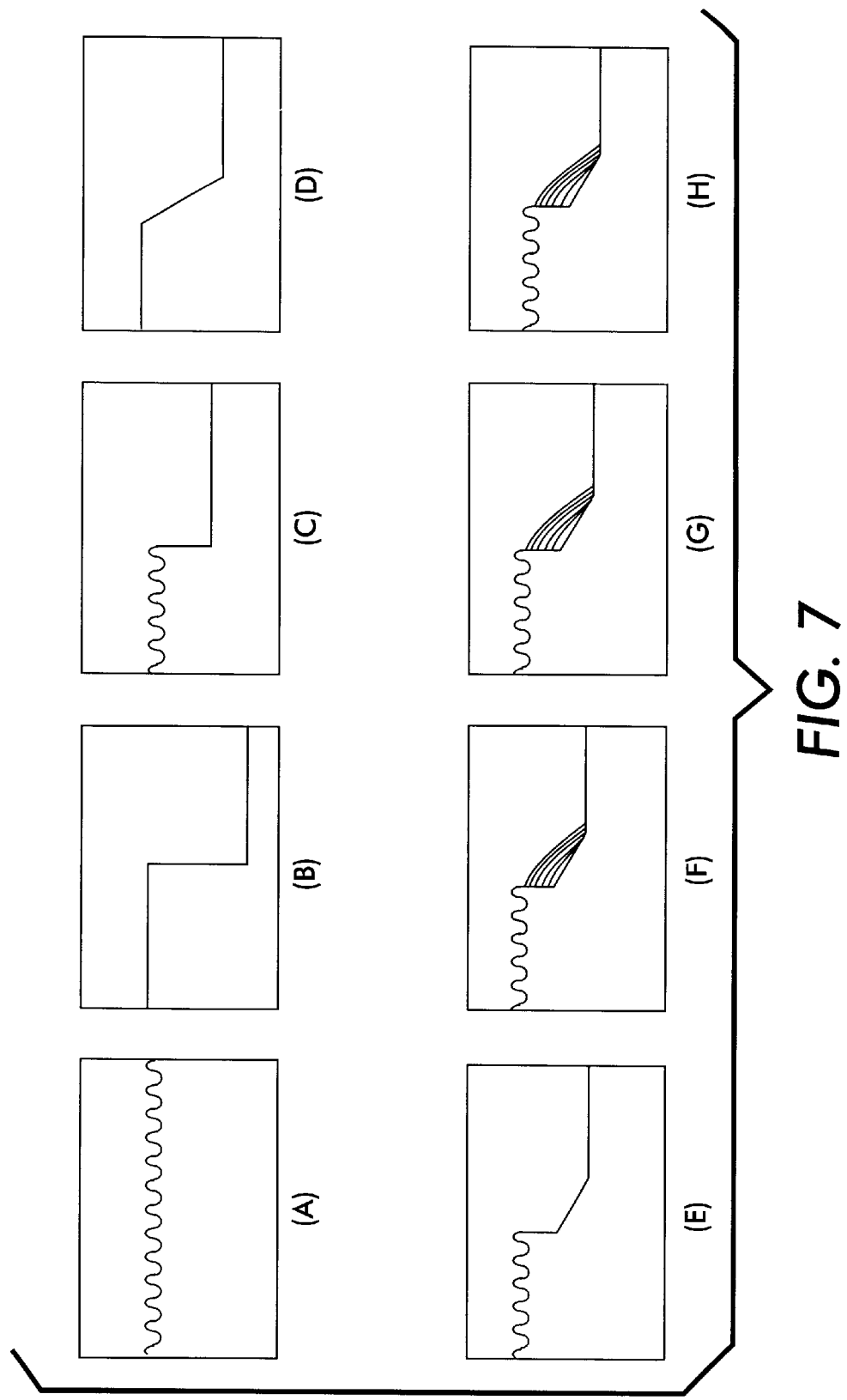
FIGS. 7(A)–(H) show a smoothing operation according to this invention.

FIGS. 7(A)–(H) show an exemplary smoothing operation of the boundary region of the systems and methods of this invention. FIG. 7(A) shows the original image signal output from the image source to the image segmenting portion 410. The segmentor 411 obtains a selector plane which decides which pixels of the image data input to the image segmenting portion 410 are to be stored into the upper plane or the lower plane, FIG. 7(B) shows the respective image and non-image regions 622 and 624 in the selector plane. As shown in FIG. 7(C), a filled signal is obtained by replacing the non-image data region 624 with the constant fill value, such as the intermediate value 128, as discussed above. As shown in FIG. 7(D), the filtered region is obtained by filtering the non-image area. FIG. 7(E) shows the smoothing result when the filled signal of FIG. 7(C) is replaced by its filtered region in FIG. 7(D).

As shown in FIG. 7(E), a discontinuity may be obtained at the boundary point when filtering the boundary region 626 using the systems and methods of this invention. However, this discontinuity is half of the size of the discontinuity which existed before the boundary region 626 was filtered. The smoothing filter of the systems and methods of this invention decreases the edge by nearly half. This may occur because the filter approach of the systems and methods of this invention smoothes the discontinuity by blurring both sides of the edge, i.e., both ends would meet halfway along the edge. Because about one half is to be filtered in the above embodiment, FIG. 7(E) shows the result as the discontinuity at half height.

FIGS. 7(F)–(H) show exemplary embodiments of results of filtering the boundary region 626 using the systems and methods of this invention using uniform, Hamming and triangular coefficients, respectively. As shown in FIGS. 7(F)–(H), by filtering using these exemplary coefficients, further reductions in the depth of the discontinuity in the boundary region 626 can be obtained. This provides a smoother transition between the image region 622 and the non-image region 624.

The filter approach of the systems and methods of this invention smoothes the discontinuity by blurring both sides of the edge using various embodiments of a segmented-filter. In one exemplary embodiment of the systems and methods of this invention, in determining the filtered signal, more weight is given to the samples in one region of the selector plane, such as the image data region 622, and less weight is given for samples in the other region, i.e., the non-image data region 624. Using the input signal, the selector plane signal, and the weight to be given to the regions, the filtered signal may be obtained.

One exemplary embodiment of a segmented-filter is:

$$y(n) = \frac{\sum_{k=-L}^{L} h(k, n)x(n+k)}{\sum_{k=-L}^{L} h(k, n)}; \text{ and}$$

$$h(k, n) = \begin{cases} 1 & \text{if } m(n+k) = 0 \\ M+1 & \text{if } m(n+k) = 1 \end{cases}$$

where:

x(n) is the input signal to be filtered;

y(n) is the filtered signal;

m(n) is the selector plane signal;

n is the index of the pixel;

L is the size of the filter; and

M is the weight given to the region, where M=0 is equivalent to not incorporating segmentation and biasing into the filtering process.

In another exemplary embodiment of the filter of the systems and methods of this invention, the segmented-filter is:

$$y(n) = \frac{\sum_{k=-L}^{L} h(k, n)x(n+k)}{\sum_{k=-L}^{L} h(k, n)}; \text{ and}$$

$$h(k, n) = \begin{cases} 1 & \text{if } m(n+k) = 0 \\ Mf(k)+1 & \text{if } m(n+k) = 1 \end{cases}$$

where:

x(n) is the input signal to be filtered;

y(n) is the filtered signal;

m(n) is the selector plane signal;

n is the index of the pixel;

L is the size of the filter;

M is the weight given to the region, where M=0 is equivalent to not incorporating segmentation and biasing into the filtering process; and f(k) is a low-pass filter with decaying coefficients.

It should be appreciated that the above-outlined segmented-filtering processes are not limiting to this invention and that the systems and methods of this invention may be accomplished any filtering processes which smooth the discontinuity between regions by blurring both sides of the edge of the regions. In particular, any non-linear filter, such as, for example, morphological filters, can be used to smooth the edges of the non-image areas. Thus, by using these filters, reductions in the depth of the discontinuity in the boundary region can be obtained. This provides a smoother transition between the image region and the non-image region.

Figure 8:
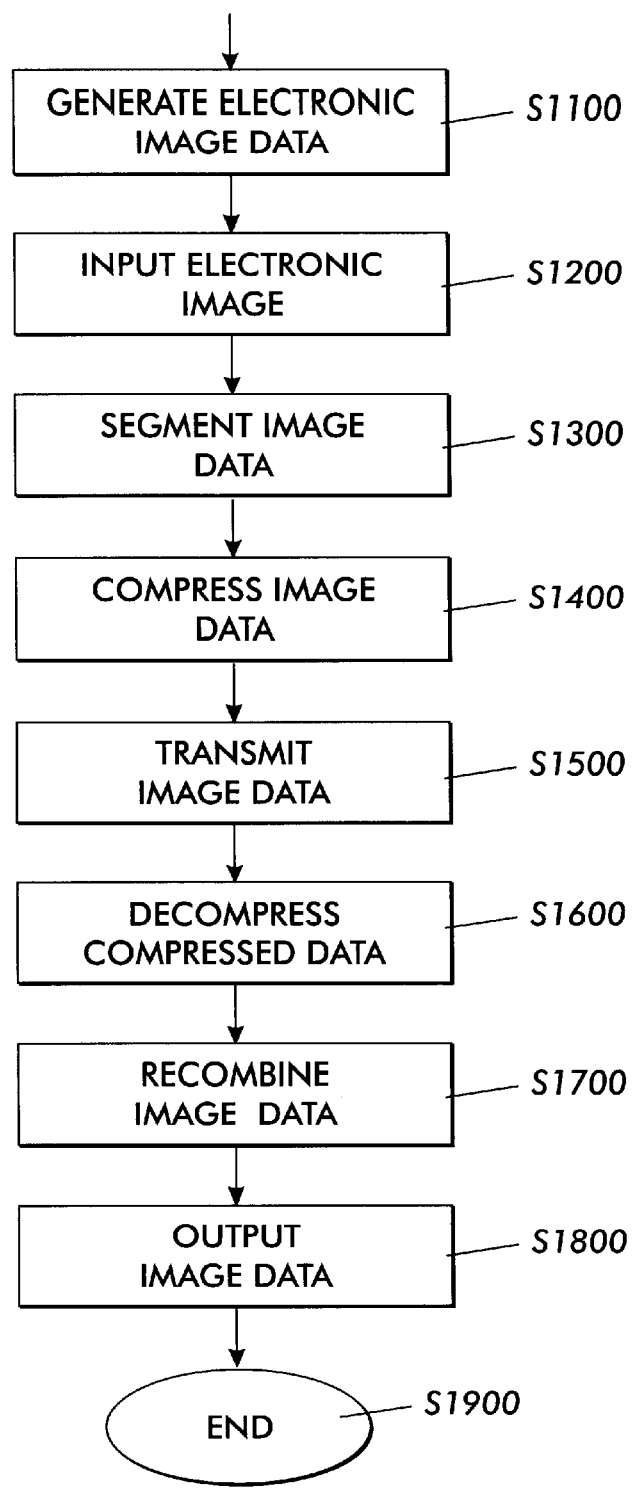
FIG. 8 is a flowchart outlining one embodiment of an image compression and decompression method according to this invention.

FIG. 8 is a flowchart outlining one embodiment of an image compression and decompression method according to this invention. Beginning in step S1000, control continues to step S1100, where electronic image data is generated from an original image. Then, in step S1200, the electronic image data is input from the image source.

It should be appreciated that, while the flowchart of FIG. 8 shows generating the electronic image data as part of the process, this step is not necessarily needed. That is, while the electronic image data can be generated by scanning an original image, or the like, the electronic image data could have been generated at any time in the past. Moreover, the electronic image data need not have been generated from an original physical image, but could have been created from scratch electronically. Accordingly, if electronic image data of the image is already available to the image source, step S1100 can be skipped, with control continuing directly from step S1000 to step S1200.

In step S1300, image data is segmented into planes of different data types. Then, in step S1400, compressed image data is generated from the image planes. Next, in step S1500, the compressed image data is transmitted, and possibly stored before being transmitted, to a device for decompressing the compressed image data.

In step S1600, the compressed image data is decompressed. Subsequently, in step S1700, the decompressed image-area data is recombined to form a decompressed image. Next, in step S1800, the decompressed and recombined image data is output. Then, in step S1900, the control routine ends.

Figure 9:
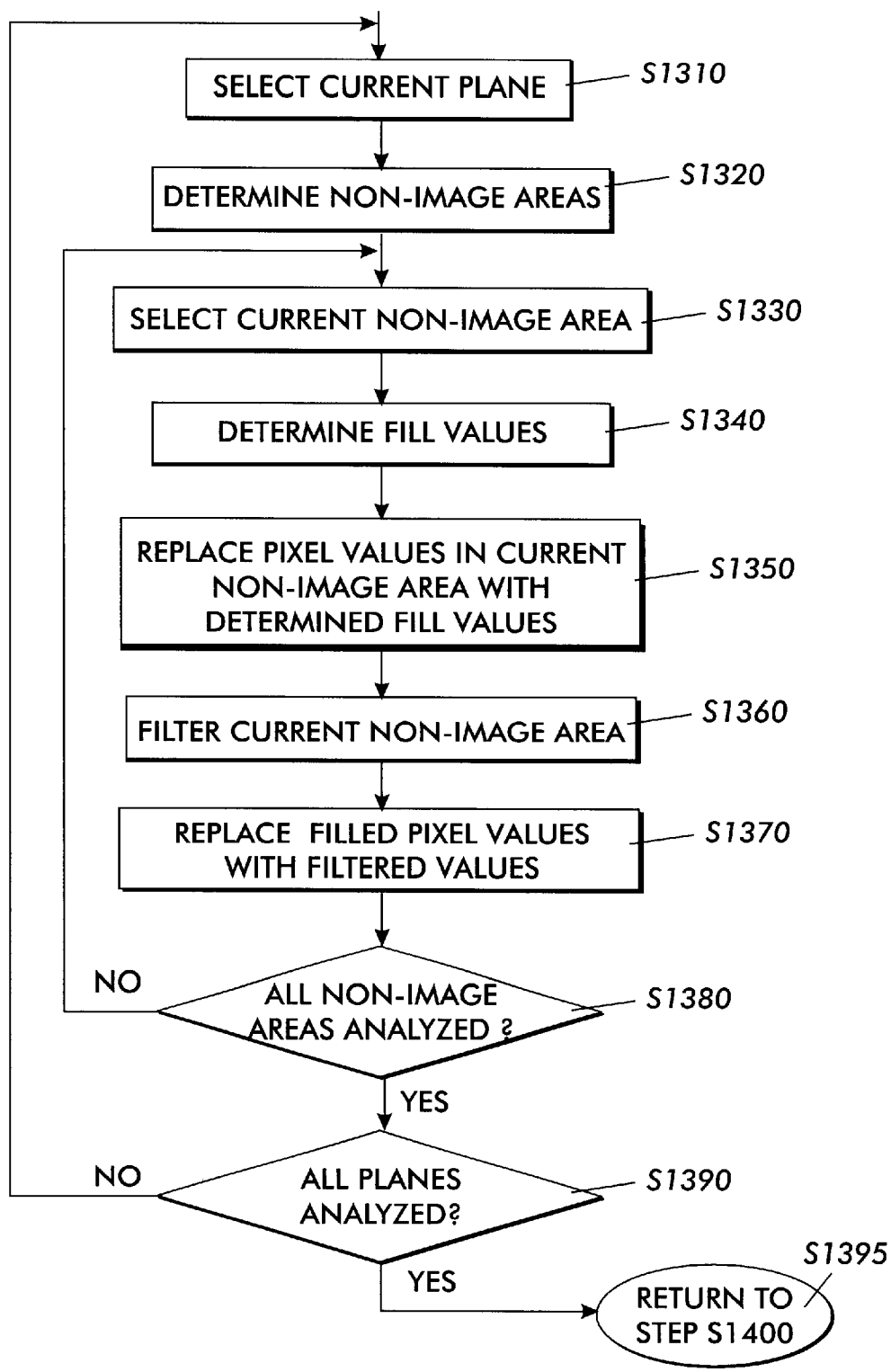
FIG. 9 is a flowchart outlining in greater detail the image segmentation according to this invention.

FIG. 9 outlines in greater detail the image segmenting process of step S1300. Beginning in step S1300, control continues to step S1310, where the first plane is selected as the current plane. Then in step S1320, the non-image areas in the current plane are identified. Control then continues to step S1330.

In step S1330, the first identified non-image area is selected as the current non-image area. Next, in step S1340, a one or more image fill values to fill the current non-image areas are determined. Then, in step S1350, the pixels values in the current non-image area is replaced by determined image fill value or values. Control then continues to step S1360.

In step S1360, the current non-image area with the one or more image fill values is filtered. Then, in step S1370, the current filled non-image area is replaced with the filtered values. Next, in step S1380, a determination is made whether all non-image areas have been analyzed. If not, control returns to step 1330. Otherwise, control continues to step S1390.

In step S1390, a determination is made whether all planes have been analyzed. If not, control returns to step 1310. Otherwise, control continues to step S1395. In step S1395, control returns to step S1400.

As shown in FIG. 1, the encoder 400 is implemented on a programmed general purpose computer. However, the encoder 400 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, which is capable of implementing step S1300 of FIGS. 8 and 9, can be used to implement the encoder 400.

Similarly, though FIG. 1 shows the decoder 500 being implemented on a programmed general purpose computer, the decoder 500 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, which is capable of implementing step S1600 of FIG. 8 can be used to implement the decoder 500.

This invention has been described in connection with the preferred embodiments. However it should be understood that there is no intent to limit the invention to the embodiments described above. On the contrary, the intent to cover all alternatives, modification, and equivalents as may be included within the spirit and scope of the invention.

What is claimed is:

1. A method for compressing an image comprising:
    segmenting the image into a plurality of image planes including a selector plane and a first plane and a second plane, each image plane comprising a plurality of pixels, the selector plane indicating whether a pixel is to be stored in the first plane or the second plane;
    determining non-image areas in each of the first plane and the second plane based on the selector plane;
    generating false image data for each determined non-image area;
    replacing the non-image areas with the false image data; and
    compressing each image plane using an appropriate compression technique for that image plane.

2. The method of claim 1, wherein, for each determined non-image area, generating false image data for that non-image area comprises generating the false image data based on image data of at least one image area adjacent that non-image area.

3. The method of claim 1, further comprising filtering the generated false image data.

4. The method of claim 3, wherein replacing the non-image areas with false image data comprises replacing the non-image areas with the filtered false image data.

5. The method of claim 3, wherein filtering the generated false image data for a non-image area comprises reducing a discontinuity between an image data value of that false image data and an image data value of at least one image area adjacent that non-image area.

6. The method of claim 1, wherein the compression technique for one of the first and second planes is one of JPEG, MMR, MR, MH, JBIG, JPEG2000 and JBIG2.

7. The method of claim 1, wherein segmenting the image into image planes further comprises segmenting one of the first and second planes into a third plane and a fourth plane.

8. The method of claim 1, wherein compressing each image plane containing the false image data using the appropriate compression technique results in decreased distortion relative to compressing an image plane that does not contain the false image data.

9. The method of claim 1, wherein compressing each image plane containing the false image data using the appropriate compression technique results in increased compression relative to compressing an image plane that does not contain the false image data.

10. The method of claim 1, wherein an image data value of the false image data is predetermined.

11. The method of claim 1, wherein, for each determined non-image area, generating false image data for that non-image area comprises generating the false image data based on a boundary region between that non-image area and at least one image area adjacent that non-image area.

12. An image compression system, comprising:
    an image segmentor that segments the image into a plurality of image planes including a selector plane and a first plane and a second plane, each image plane comprising a plurality of pixels, the selector plane indicating whether a pixel is to be stored in the first plane or the second plane;
    a plane analyzer that determines non-image areas in each of the first plane and the second plane based on the selector plane;
    a false image data generator that generates false image data for each determined non-image area and replaces the non-image areas with the false image data; and
    a compressor that compresses each image plane using an appropriate compression technique for that image plane.

13. The image compression system of claim 12, wherein the false image data generator generates, for each determined non-image area, false image data for that non-image area based on image data of at least one image area adjacent that non-image area.

14. The image compression system of claim 12, further comprising a filter that filters the generated false image data.

15. The image compression system of claim 14, wherein the false image data generator replaces the non-image areas with the filtered false image data.

16. The image compression system of claim 14, wherein the filter reduces a discontinuity between an image data value of that false image data and an image data value of at least one image area adjacent that non-image area.

17. The image compression system of claim 12, wherein the compression technique for one of the first and second planes is one of JPEG, MMR, MR, MH, JBIG, JPEG2000 and JBIG2.

18. The image compression system of claim 12, wherein the image segmentor further segments one of the first and second planes into a third plane and a fourth plane.

19. The image compression system of claim 12, wherein an image plane compressed using the image compression system has a reduced distortion ratio.

20. The image compression system of claim 12, wherein an image plane compressed using the image compression system has an increased compression ratio.

21. The image compression system of claim 12, wherein an image data value of the false image data is predetermined.

22. The image compression system of claim 12, wherein, for each determined non-image area, the false image data generator generates the false image data based on a boundary region between that non-image area and at least one image area adjacent that non-image area.

23. An image compression system, comprising:
- means for segmenting the image into a plurality of image planes including a selector plane and a first plane and a second plane, each image plane comprising a plurality of pixels, the selector plane indicating whether a pixel is to be stored in the first plane or the second plane;
- means for determining non-image areas in each of the first plane and the second plane based on the selector plane;
- means for generating false image data for each determined non-image area;
- means for replacing the non-image areas with the false image data; and
- means for compressing each image plane using an appropriate compression technique for that image plane.

24. The image compression system of claim 23, wherein, for each determined non-image area, the means for generating false image data generates false image data for that non-image area based on image data of at least one image area adjacent that non-image area.

25. The image compression system of claim 23, further comprising means for filtering the generated false image data.

26. The image compression system of claim 25, wherein the means for replacing the non-image areas with false image data replaces the non-image areas with the filtered false image data.

27. The image compression system of claim 25, wherein the means for filtering the generated false image data for a non-image area reduces a discontinuity between an image data value of that false image data and an image data value of at least one image area adjacent that non-image area.

28. The image compression system of claim 23, wherein the compression technique for one of the first and second planes is one of JPEG, MMR, MR, MH, JBIG, JPEG2000 and JBIG2.

29. The image compression system of claim 23, wherein the means for segmenting the image into image planes further segments one of the first and second planes into a third plane and a fourth plane.

30. The image compression system of claim 23, wherein an image plane compressed using the image compression system has a reduced distortion ratio.

31. The image compression system of claim 23, wherein an image plane compressed using the image compression system has an increased compression ratio.

32. The image compression system of claim 23, wherein an image data value of the false image data is predetermined.

33. The image compression system of claim 23, wherein, for each determined non-image area, the means for generating false image data for that non-image area generates the false image data based on a boundary region between that non-image area and at least one image area adjacent that non-image area.

* * * * *